United States Patent
Seidel et al.

(10) Patent No.: US 9,376,561 B2
(45) Date of Patent: Jun. 28, 2016

(54) ABS COMPOSITIONS WITH IMPROVED SURFACE AFTER HEAT-MOISTURE STORAGE

(71) Applicant: Bayer Intellectual Property GmbH, Monheim (DE)

(72) Inventors: Andreas Seidel, Dormagen (DE); Eckhard Wenz, Cologne (DE); Hans-Juergen Klankers, Leverkusen (DE); Birgit Derfuss, Muelheim an de Ruhr (DE); Hans-Jurgen Thiem, Dormagen (DE); Sven Hobeika, Solingen (DE); Ingmar Hermsdorfer, Krefeld (DE)

(73) Assignee: BAYER MATERIALSCIENCE AG, Leverkusen (DE)

( * ) Notice: Subject to any disclaimer, the term of this patent is extended or adjusted under 35 U.S.C. 154(b) by 462 days.

(21) Appl. No.: 13/866,796

(22) Filed: Apr. 19, 2013

(65) Prior Publication Data

US 2013/0281595 A1   Oct. 24, 2013

(30) Foreign Application Priority Data

Apr. 23, 2012   (EP) .................................... 12165143

(51) Int. Cl.
| | |
|---|---|
| *C08L 69/00* | (2006.01) |
| *C08L 55/02* | (2006.01) |
| *C08L 51/00* | (2006.01) |
| *C08F 2/22* | (2006.01) |
| *C08F 220/44* | (2006.01) |
| *C08L 51/04* | (2006.01) |
| *C08F 257/02* | (2006.01) |

(52) U.S. Cl.
CPC ............... *C08L 69/00* (2013.01); *C08F 257/02* (2013.01); *C08L 51/04* (2013.01); *C08L 2205/025* (2013.01); *C08L 2205/035* (2013.01)

(58) Field of Classification Search
CPC ......... C08L 69/00; C08L 55/02; C08L 51/00; C08L 2205/03; C08L 2207/04; C08L 27/12; C08L 25/08; C08F 2/22; C08F 220/44
USPC .................................................. 524/504, 423
See application file for complete search history.

(56) References Cited

U.S. PATENT DOCUMENTS

| | | | |
|---|---|---|---|
| 5,314,990 A | 5/1994 | Jansen et al. | |
| 2010/0292385 A1* | 11/2010 | Fischer | ............... B29C 45/0001 524/439 |

FOREIGN PATENT DOCUMENTS

| | | |
|---|---|---|
| DE | 2021398 A1 | 11/1970 |
| DE | 2815098 A1 | 10/1978 |
| EP | 0459161 A2 | 12/1991 |
| WO | 9828344 A1 | 7/1998 |
| WO | 2009071537 A2 | 6/2009 |

* cited by examiner

*Primary Examiner* — Ling Choi
*Assistant Examiner* — Ronald Grinsted
(74) *Attorney, Agent, or Firm* — McBee Moore Woodward Vanik IP, LLC

(57) ABSTRACT

Described herein are polymer compositions comprising at least one inorganic salt comprising a cation selected from the group consisting of alkali metals, alkaline earth metals and aluminum, and an anion selected from the group consisting of chloride, sulfate, nitrate, phosphate, acetate and formate, in a concentration of 100 to 5000 mg/kg, based on the composition, and wherein the salt is present in the composition exclusively in dissolved form or in the form of amorphous and/or crystalline inclusions having a size of not more than 60 μm.
Compositions of the present invention are distinguished by an improved surface after heat-moisture storage and are suitable in particular for the production of moldings with a high gloss finish that demand a class A surface, which have optionally been subjected, in whole or in part, to a further surface treatment step involving e.g. lacquering, in-mold decoration, or metallization by vacuum deposition or galvanization.

20 Claims, No Drawings

ABS COMPOSITIONS WITH IMPROVED SURFACE AFTER HEAT-MOISTURE STORAGE

CROSS REFERENCE TO RELATED APPLICATIONS

This application claims priority to European Patent Application No. 12165143.4, filed Apr. 23, 2012, the contents of which is incorporated herein by reference in its entirety.

BACKGROUND

1. Field of the Invention

The present invention relates to thermoplastic compositions comprising vinylaromatic copolymers, prepared by the emulsion polymerization method, which comprise salt inclusions resulting from the preparative process, the mouldings produced from the compositions being distinguished by an improved surface quality after heat-moisture storage and preferably having an ageing-resistant class A surface free of visual defects.

The present invention further relates to a process for the preparation of the compositions according to the invention, to the use of the compositions according to the invention for the production of mouldings, and to mouldings which have been produced from the compositions according to the invention.

2. Description of Related Art

Compositions comprising vinylaromatic copolymers, prepared by the emulsion polymerization method, which comprise salt inclusions resulting from the preparative process are known in the literature. There are various origins of such salt inclusions resulting from the preparative process, examples being emulsifier solutions, polymerization initiator solutions, buffer solutions and precipitant solutions used as auxiliary substances in the emulsion polymerization method, which remain in the material or are not completely removed from the material during the work-up of the polymer, depending on the process.

In particular, the addition of acids and/or salts to precipitate vinyl polymer latices prepared by emulsion polymerization, which is normally carried out in traditional processes, e.g. in EP 459 161 B1, DE 2 021 398 and DE 28 15 098, makes a substantial contribution to the salt load in the final polymer, since removal of these salts from the product by means of downstream process steps (washing) is generally unsatisfactory or requires a great deal of energy and water/waste water. Examples of coagulants used are preferably aqueous solutions of water-soluble salts such as alkali metal, alkaline earth metal or aluminium chlorides, sulfates, nitrates, phosphates, acetates, formates, aluminates or carbonates, particularly preferably aluminium chloride, calcium chloride and magnesium sulfate solutions, optionally in combination with inorganic or organic acids such as hydrochloric acid, sulfuric acid, phosphoric acid, boric acid, formic acid, acetic acid, propionic acid and citric acid.

According to the literature, such salt inclusions in compositions comprising vinylaromatic copolymers can lead to unwanted effects.

WO 2009/071537, for example, discloses that magnesium and/or calcium compounds in impact strength modified vinylaromatic copolymers selected from the group comprising acrylonitrile-butadiene-styrene (ABS) copolymers, acrylonitrile-styrene-acrylate (ASA) copolymers and methacrylate-acrylonitrile-butadiene-styrene (MABS) copolymers, optionally comprising polycarbonate and additives, lead to unwanted coating of the moulding tool in thermoplastic moulding by injection or extrusion, and accordingly claims compositions containing 0 mg/kg to 100 mg/kg of magnesium and/or calcium compounds. The emulsion polymers used in these compositions are precipitated by freeze precipitation on a flake ice machine rather than by the addition of magnesium sulfate solution, as is traditionally customary.

WO 98/28344 discloses a process for the continuous shear-induced coagulation of aqueous dispersions of grafted rubbers which overcomes the known disadvantage of precipitation by means of acids and/or salts as coagulants, namely that impurities often remain in the worked-up polymers and can detract from the properties of the product.

One problem of thermoplastic compositions comprising vinylaromatic copolymers prepared by the emulsion polymerization method, with salt inclusions resulting from the preparative process, is that mouldings produced therefrom are susceptible to the unwanted formation of surface defects (blistering) on exposure to moisture (e.g. condensed water or atmospheric moisture), especially at elevated temperatures, thereby restricting the use of such compositions in mouldings with a high gloss finish that demand a class A surface.

SUMMARY

An object of the present invention was thus to provide thermoplastic compositions comprising vinylaromatic copolymers, prepared by the emulsion polymerization method, which, despite the salt load resulting from the preparative process, are distinguished by a high surface quality of the mouldings produced therefrom, after heat-moisture storage, and are suitable for the production of mouldings with an ageing-resistant class A surface free of visual defects.

Within the framework of the present invention, "class A surfaces free of visual defects" are to be understood as meaning surfaces that do not have any blisters whose diameter is perceived as disruptive by the naked eye. Such blisters classified as visually disruptive have a diameter of more than 300 µm, preferably of more than 240 µm and particularly preferably of more than 200 µm.

However, such class A surfaces free of visual defects nevertheless frequently have blisters that are visible with optical aids, e.g. a magnifying glass or microscope. The maximum defect size, i.e. the diameter of the largest defects with blister topography found on such class A surfaces free of visual defects, ranges preferably from 1 µm to 300 µm, particularly preferably from 10 µm to 240 µm and very particularly preferably from 50 to 200 µm.

Surprisingly, it has now been found that this object is achieved by polymer compositions comprising A) 0 to 98 parts by weight, preferably 1 to 95 parts by weight and particularly preferably 30 to 85 parts by weight, based on the sum of A and B, of one or a mixture of several thermoplastic polymers other than B, B) 2 to 100 parts by weight, preferably 5 to 99 parts by weight and particularly preferably 15 to 70 parts by weight, based on the sum of A and B, of B1) at least one graft polymer prepared by the emulsion polymerization method, B2) optionally at least one graft polymer prepared by the bulk, suspension or solution polymerization method, and B3) optionally at least one rubber-free vinyl (co)polymer, and C) 0 to 30 parts by weight, preferably 0.1 to 20 parts by weight and very particularly preferably 0.3 to 7 parts by weight, based on the sum of A and B, of at least one commercially available polymer additive, the sum of the parts by weight of A and B being 100, characterized in that (i) the composition comprises at least one inorganic salt consisting of a cation selected from the group comprising alkali metals, alkaline earth metals and aluminium, and an anion selected from the group comprising chloride, sulfate, nitrate, phosphate, acetate and formate, in a concentration of the salt or salt mixture of 100 to 5000 mg/kg, preferably of 150 to 2000 mg/kg and particularly preferably of 200 to 1000 mg/kg, based on the composition, and (ii) this salt is present in the composition exclusively in dissolved form or, preferably, in the form of amorphous or crystalline inclusions having a size of less than 60 µm, preferably of less than 40 µm and particularly preferably of less than 30 µm.

Preferably, the salt is an alkali metal, alkaline earth metal or aluminium chloride or an alkali metal, alkaline earth metal or aluminium sulfate, or a mixture thereof; particularly preferably, the salt is selected from the group comprising aluminium chloride, calcium chloride and magnesium sulfate, or mixtures thereof; very particularly preferably, the salt is magnesium sulfate.

DETAILED DESCRIPTION OF A PREFERRED EMBODIMENT

In one preferred embodiment, the composition consists only of components A, B and C.

In another preferred embodiment, component B consists of at least two components selected from the group comprising B1, B2 and B3, particularly preferably of components B1 and B3 and very particularly preferably of B1, B2 and B3.

The inorganic salt is preferably introduced into the composition via component B1, which preferably comprises the salt as an impurity resulting from the preparative process. Component B1 preferably comprises the salt in a concentration of 100 to 10,000 mg/kg, preferably of 150 to 3000 mg/kg and particularly preferably of 200 to 1500 mg/kg, based on the composition.

The content of inorganic salt is determined via the contents of chloride, sulfate, nitrate, phosphate, acetate or formate anions, preferably of chloride or sulfate anions and particularly preferably of sulfate anions. Such a determination is performed, after appropriate digestion of the material, by ion chromatography via conductivity measurement in accordance with the method described in the Examples for determining the magnesium sulfate content.

The sizes of the salt inclusions are determined by light microscopy or scanning electron microscopy (SEM) on sections through the relevant defects. The SEM method has the advantage that a local high resolution elemental analysis of the defect can be carried out in parallel via energy dispersive x-ray spectroscopy (EDX), so it can be verified unambiguously that the defect is salt and it can also be shown what type of salt is involved.

The method which enables the salt to be present in the polymer composition exclusively in dissolved form or in the form of amorphous or crystalline inclusions having a size of less than 60 µm, preferably of less than 40 µm and particularly preferably of less than 30 µm is of secondary importance to the present invention.

Preferably, this can be achieved by means of melt filtration during the preparation of the composition by compounding, preferably by means of sieves with a mesh size of less than 60 µm, particularly preferably of less than 40 µm and very particularly preferably of less than 30 µm. Alternatively, the component via which the salt is introduced into the composition, i.e. preferably component B1 or a precompound of component B1 with all or part of B2 and/or B3, can be melt-filtered in an upstream process step. This can again be done preferably by using sieves with a mesh size of less than 60 µm, particularly preferably of less than 40 µm and very particularly preferably of less than 30 µm.

It is also possible to reduce the salt inclusions to the desired size during the compounding process by applying adequate shear, and to disperse and/or dissolve them in the composition. It can be of advantage here to add a dispersant and/or a metal complexing agent to the composition, the purpose of which is to reduce the energy required for said adequate comminution of the salt inclusions effected by shear, or to increase the solubility of the salt in the polymer composition. These dispersants and/or metal complexing agents can be added e.g. as an additional component during the preparation of the composition by compounding. Alternatively, they can be premixed in an upstream process step with the component that introduces the salt; in one preferred embodiment, this mixture is melted again and the components of the mixture are dispersed with one another in the melt. Alternatively, the dispersants and/or metal complexing agents can already be introduced during the preparation of the component that introduces the salt.

Component A

Suitable components A are basically any types of component B of different thermoplastic polymers or mixtures of two or more of such thermoplastic polymers.

Examples which may be mentioned here are polyolefins (such as polyethylene and polypropylene), thermoplastic polyurethanes, polyacetals (such as polyoxymethylene and polyphenylene ethers), polyamides, polyimides, polycarbonates, polyesters, polyester carbonates, polysulfones, polyarylates, polyaryl ethers, polyphenylene ethers, polyaryl sulfones, polyaryl sulfides, polyether sulfones, polyphenylene sulfide, polyether ketones, polyamide-imides, polyetherimides and polyesterimides.

Particularly preferably, at least one polymer selected from the group comprising polycarbonate, polyester carbonate and polyester, particularly preferably at least one polymer selected from the group comprising aromatic polycarbonate, aromatic polyester carbonate and aromatic polyester, and very particularly preferably a polymer selected from the group comprising aromatic polycarbonate and aromatic polyester carbonate, is used as component A.

Aromatic polycarbonates and/or aromatic polyester carbonates suitable according to the invention as component A are known in the literature or can be prepared by processes known in the literature (for the preparation of aromatic polycarbonates, see e.g. Schnell, "Chemistry and Physics of Polycarbonates", Interscience Publishers, 1964, and DE-AS 1 495 626, DE-A 2 232 877, DE-A 2 703 376, DE-A 2 714 544, DE-A 3 000 610, DE-A 3 832 396; for the preparation of aromatic polyester carbonates, see e.g. DE-A 3 077 934).

Aromatic polycarbonates are prepared e.g. by reacting diphenols with carbonyl halides, preferably phosgene, and/or with aromatic dicarboxylic acid dihalides, preferably benzenedicarboxylic acid dihalides, by the phase boundary method, optionally using chain terminators, e.g. monophenols, and optionally using trifunctional or more than trifunctional branching agents, e.g. triphenols or tetraphenols. They can also be prepared by a melt polymerization method by reacting diphenols with e.g. diphenyl carbonate.

Diphenols for the preparation of the aromatic polycarbonates and/or aromatic polyester carbonates are preferably those of formula (I):

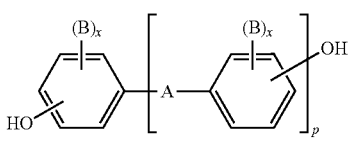

where

A is a single bond, C1- to C5-alkylene, C2- to C5-alkylidene, C5- to C6-cycloalkylidene, —O—, —SO—, —CO—, —S—, —SO$_2$—, C6- to C12-arylene, to which other aromatic rings optionally comprising heteroatoms can be fused, or a radical of formula (II) or (III):

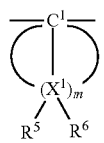

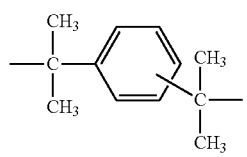

B are each C1- to C12-alkyl, preferably methyl, or halogen, preferably chlorine and/or bromine, x independently of one another are each 0, 1 or 2, p is 1 or 0, R5 and R6 can be chosen individually for each X1 and independently of one another are hydrogen or C1- to C6-alkyl, preferably hydrogen, methyl or ethyl, X1 is carbon and m is an integer from 4 to 7, preferably 4 or 5, with the proviso that R5 and R6 are simultaneously alkyl on at least one atom X1.

Preferred diphenols are hydroquinone, resorcinol, dihydroxydiphenols, bis(hydroxyphenyl)-C1-C5-alkanes, bis(hydroxyphenyl)-C5-C6-cycloalkanes, bis(hydroxyphenyl) ethers, bis(hydroxyphenyl) sulfoxides, bis(hydroxyphenyl) ketones, bis(hydroxyphenyl) sulfones, α,α-bis(hydroxyphenyl)diisopropylbenzenes and their ring-brominated and/or ring-chlorinated derivatives.

Particularly preferred diphenols are 4,4'-dihydroxybiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulfide, 4,4'-dihydroxydiphenyl sulfone and their di- and tetrabrominated or chlorinated derivatives, e.g. 2,2-bis(3-chloro-4-hydroxyphenyl)propane, 2,2-bis(3,5-dichloro-4-hydroxyphenyl)-propane or 2,2-bis(3,5-dibromo-4-hydroxyphenyl)propane. 2,2-Bis(4-hydroxyphenyl)-propane (bisphenol A) is particularly preferred.

The diphenols can be used individually or as any desired mixtures. They are known in the literature or obtainable by processes known in the literature.

Examples of chain terminators suitable for the preparation of the thermoplastic aromatic polycarbonates are phenol, p-chlorophenol, p-tert-butylphenol or 2,4,6-tribromophenol, as well as long-chain alkylphenols such as 4-[2-(2,4,4-trimethylpentyl)]phenol, 4-(1,3-tetramethylbutyl)phenol according to DE-A 2 842 005, or monoalkylphenols or dialkylphenols having a total of 8 to 20 carbon atoms in the alkyl substituents, such as 3,5-ditert-butylphenol, p-isooctylphenol, p-tert-octylphenol, p-dodecylphenol, 2-(3,5-dimethylheptyl)phenol and 4-(3,5-dimethylheptyl)phenol. The amount of chain terminators to be used is generally between 0.5 mol % and 10 mol %, based on the total number of moles of all the diphenols used.

The thermoplastic aromatic polycarbonates preferably have mean weight-average molecular weights (Mw, measured by gel permeation chromatography in methylene chloride at 25° C. with polycarbonate as standard) of 20,000 to 40,000 g/mol, preferably of 22,000 to 35,000 g/mol and particularly preferably of 24,000 to 32,000 g/mol.

The thermoplastic aromatic polycarbonates can be branched in known manner, preferably by the incorporation of 0.05 to 2.0 mol %, based on the total amount of diphenols used, of trifunctional or more than trifunctional compounds, e.g. those with three or more phenolic groups.

Both homopolycarbonates and copolycarbonates are suitable. To prepare copolycarbonates according to the invention as component A, it is also possible to use 1 to 25 wt. %, preferably 2.5 to 25 wt. %, based on the total amount of diphenols to be used, of polydiorganosiloxanes with hydroxyaryloxy end groups. These are known (U.S. Pat. No. 3,419,634) and can be prepared by processes known in the literature. The preparation of copolycarbonates containing polydiorganosiloxanes is described in DE-A 3 334 782.

Preferred polycarbonates, apart from bisphenol A homopolycarbonates, are copolycarbonates of bisphenol A with up to 15 mol %, based on the total number of moles of diphenols, of other diphenols cited as preferred or particularly preferred, especially 2,2-bis(3,5-dibromo-4-hydroxyphenyl) propane.

Aromatic dicarboxylic acid dihalides for the preparation of aromatic polyester-carbonates are preferably the diacid dichlorides of isophthalic acid, terephthalic acid, diphenyl ether 4,4'-dicarboxylic acid and naphthalene-2,6-dicarboxylic acid.

Particular preference is afforded to mixtures of the diacid dichlorides of isophthalic acid and terephthalic acid in a ratio of between 1:20 and 20:1.

A carbonyl halide, preferably phosgene, is additionally used concomitantly as a difunctional acid derivative in the preparation of polyester carbonates.

Suitable chain terminators for the preparation of the aromatic polyester carbonates, apart from the previously cited monophenols, are their chlorocarbonic acid esters and the acid chlorides of aromatic monocarboxylic acids, which can optionally be substituted by C1- to C22-alkyl groups or by halogen atoms, and aliphatic C2- to C22-monocarboxylic acid chlorides.

The amount of chain terminators is 0.1 to 10 mol % in each case, based on moles of diphenol in the case of phenolic chain terminators and on moles of dicarboxylic acid dichloride in the case of monocarboxylic acid chloride chain terminators.

The aromatic polyester carbonates can also incorporate aromatic hydroxycarboxylic acids.

The aromatic polyester carbonates can be linear or, in known manner, branched (cf. DE-A 2 940 024 and DE-A 3 007 934).

Examples of branching agents which can be used are trifunctional or more than trifunctional carboxylic acid chlorides such as trimesic acid trichloride, cyanuric acid trichloride, 3,3',4,4'-benzophenonetetracarboxylic acid tetrachloride, 1,4,5,8-naphthalene-tetracarboxylic acid tetrachloride or pyromellitic acid tetrachloride, in amounts of 0.01 to 1.0 mol % (based on dicarboxylic acid dichlorides used), or trifunctional or more than trifunctional phenols such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)-benzene, 1,1,1-tri(4-hydroxyphenyl) ethane, tri(4-hydroxyphenyl)phenylmethane, 2,2-bis-[4,4-bis(4-hydroxyphenyl)cyclohexyl]propane, 2,4-bis(4-hydroxyphenylisopropyl)phenol, tetra(4-hydroxyphenyl) methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]-phenoxy)methane or 1,4-bis[4,4'-dihydroxytriphenyl)methyl]benzene, in amounts of 0.01 to 1.0 mol %, based on diphenols used. Phenolic branching agents can be introduced together with the diphenols; acid chloride branching agents can be introduced together with the acid dichlorides.

The proportion of carbonate structural units in the thermoplastic aromatic polyester carbonates can vary freely. Preferably, the proportion of carbonate groups is up to 100 mol %, especially up to 80 mol % and particularly preferably up to 50 mol %, based on the total number of ester groups and carbonate groups. Both the ester and the carbonate parts of the aromatic polyester carbonates can be present in the form of blocks or randomly distributed in the polycondensate.

The thermoplastic aromatic polycarbonates and polyester carbonates can be used on their own or in any desired mixture.

Component B1

Component B1 consists of graft polymers prepared by the emulsion polymerization method from, in one preferred embodiment, B1.1) 5 to 95 wt. %, preferably 10 to 70 wt. % and particularly preferably 20 to 60 wt. %, based on component B1, of a mixture of B1.1.1) 65 to 85 wt. %, preferably 70 to 80 wt. %, based on B1.1, of at least one monomer selected from the group comprising vinylaromatics (e.g. styrene, α-methylstyrene), ring-substituted vinylaromatics (e.g. p-methylstyrene, p-chlorostyrene) and methacrylic acid (C1-C8)-alkyl esters (e.g. methyl methacrylate, ethyl methacrylate), and B1.1.2) 15 to 35 wt. %, preferably 20 to 30 wt. %, based on B1.1, of at least one monomer selected from the group comprising vinyl cyanides (e.g. unsaturated nitriles such as acrylonitrile and methacrylonitrile), (meth)acrylic acid (C1-C8)-alkyl esters (e.g. methyl methacrylate, n-butyl acrylate, tert-butyl acrylate) and derivatives (e.g. anhydrides and imides) of unsaturated carboxylic acids (e.g. maleic anhydride and N-phenylmaleimide), and B1.2) 95 to 5 wt. %, preferably 90 to 30 wt. % and particularly preferably 80 to 40 wt. %, based on component B1, of at least one elastomeric graft base.

The graft base preferably has a glass transition temperature of <0° C., more preferably of <−20° C. and particularly preferably of <−60° C.

Unless indicated otherwise in the present invention, glass transition temperatures are determined by differential scanning calorimetry (DSC) according to standard DIN EN 61006 at a heating rate of 10 K/min with nitrogen as the protective gas, Tg being defined as the mid-point (tangent method).

The graft particles in component B1 preferably have a mean size (D50 value) of 0.05 to 5 μm, preferably of 0.1 to 1.0 μm and particularly preferably of 0.2 to 0.5 μm.

The mean particle size D50 is the diameter above and below which 50 wt. % of the particles lie. Unless explicitly indicated otherwise in the present patent application, it is determined by ultracentrifuge measurement (W. Scholtan, H. Lange, Kolloid, Z. and Z. Polymere 250 (1972), 782-1796).

Preferred monomers B1.1.1 are selected from at least one of the monomers styrene, α-methylstyrene and methyl methacrylate; preferred monomers B1.1.2 are selected from at least one of the monomers acrylonitrile, maleic anhydride and methyl methacrylate.

Particularly preferred monomers B1.1.1 and B1.1.2 are styrene and acrylonitrile, respectively.

Examples of graft bases B1.2 suitable for the graft polymers B1 are diene rubbers, diene-vinyl block copolymer rubbers, EP(D)M rubbers, i.e. those based on ethylene/propylene and optionally diene, acrylate, polyurethane, silicone, chloroprene and ethylene/vinyl acetate rubbers, and mixtures of such rubbers, or silicone-acrylate composite rubbers in which the silicone and acrylate components are chemically bonded together (e.g. by grafting).

Preferred graft bases B1.2 are diene rubbers (e.g. based on butadiene or isoprene), diene-vinyl block copolymer rubbers (e.g. based on butadiene and styrene blocks), copolymers of diene rubbers with other copolymerizable monomers (e.g. as in B1.1.1 and B1.1.2), and mixtures of the aforesaid types of rubbers. Pure polybutadiene rubber and styrene-butadiene block copolymer rubber are particularly preferred.

The gel content of the graft polymers is at least 40 wt. %, preferably at least 60 wt. % and particularly preferably at least 75 wt. % (measured in acetone).

Unless indicated otherwise in the present invention, the gel content of the graft polymers is determined at 25° C. as the proportion insoluble in acetone as solvent (M. Hoffmann, H. Krömer, R. Kuhn, Polymeranalytik I and II, Georg Thieme-Verlag, Stuttgart 1977).

The graft polymers B1 are prepared by free radical polymerization.

As a result of the preparative process, the graft polymer B1 generally comprises free copolymer of B1.1.1 and B1.1.2, i.e. copolymer not chemically bonded to the rubber base, which is distinguished in that it can be dissolved in suitable solvents (e.g. acetone).

Preferably, component B1 comprises a free copolymer of B1.1.1 and B1.1.2 which has a weight-average molecular weight (Mw), determined by gel permeation chromatography with polystyrene as standard, preferably of 30,000 to 150,000 g/mol, particularly preferably of 40,000 to 120,000 g/mol.

Component B2

As component B2 the compositions according to the invention can optionally comprise graft polymers prepared by the bulk, solution or suspension polymerization method. In one preferred embodiment, these are graft polymers of B2.1) 5 to 95 wt. %, preferably 80 to 93 wt. %, particularly preferably 85 to 92 wt. % and very particularly preferably 87 to 93 wt. %, based on component B2, of a mixture of B2.1.1) 65 to 85 wt. %, preferably 70 to 80 wt. %, based on mixture B2.1, of at least one monomer selected from the group comprising vinylaromatics (e.g. styrene, α-methylstyrene), ring-substituted vinylaromatics (e.g. p-methylstyrene, p-chlorostyrene) and methacrylic acid (C1-C8)-alkyl esters (e.g. methyl methacrylate, ethyl methacrylate), and B2.1.2) 15 to 35 wt. %, preferably 20 to 30 wt. %, based on mixture B2.1, of at least one monomer selected from the group comprising vinyl cyanides (e.g. unsaturated nitriles such as acrylonitrile and methacrylonitrile), (meth)acrylic acid (C1-C8)-alkyl esters (e.g. methyl methacrylate, n-butyl acrylate, tert-butyl acrylate) and derivatives (e.g. anhydrides and imides) of unsaturated carboxylic acids (e.g. maleic anhydride and N-phenylmaleimide), and B2.2) 95 to 5 wt. %, preferably 20 to 7 wt. %, particularly preferably 15 to 8 wt. % and very particularly preferably 13 to 7 wt. %, based on component B2, of at least one graft base.

The graft base preferably has a glass transition temperature of <0° C., preferably of <−20° C. and particularly preferably of <−60° C.

The graft particles in component B2 preferably have a mean size (D50 value) of 0.1 to 10 µm, preferably of 0.2 to 2 µm, particularly preferably of 0.3 to 1.0 µm and very particularly preferably of 0.3 to 0.6 µm.

Preferred monomers B2.1.1 are selected from at least one of the monomers styrene, α-methylstyrene and methyl methacrylate; preferred monomers B2.1.2 are selected from at least one of the monomers acrylonitrile, maleic anhydride and methyl methacrylate.

Particularly preferred monomers B2.1.1 and B2.1.2 are styrene and acrylonitrile, respectively.

Examples of graft bases B2.2 suitable for the graft polymers B2 are diene rubbers, diene-vinyl block copolymer rubbers, EP(D)M rubbers, i.e. those based on ethylene/propylene and optionally diene, acrylate, polyurethane, silicone, chloroprene and ethylene/vinyl acetate rubbers, and mixtures of such rubbers, or silicone-acrylate composite rubbers in which the silicone and acrylate components are chemically bonded together (e.g. by grafting).

Preferred graft bases B2.2 are diene rubbers (e.g. based on butadiene or isoprene), diene-vinyl block copolymer rubbers (e.g. based on butadiene and styrene blocks), copolymers of diene rubbers with other copolymerizable monomers (e.g. as in B2.1.1 and B2.1.2), and mixtures of the aforesaid types of rubbers. Styrene-butadiene block copolymer rubbers and mixtures of styrene-butadiene block copolymer rubbers with pure polybutadiene rubber are particularly preferred as the graft base B2.2.

The gel content of the graft polymers B2 is preferably 10 to 35 wt. %, particularly preferably 15 to 30 wt. % and very particularly preferably 17 to 23 wt. % (measured in acetone).

Examples of particularly preferred polymers B2 are ABS polymers prepared by free radical polymerization which, in one preferred embodiment, comprise up to 10 wt. %, particularly preferably up to 5 wt. % and very particularly preferably 2 to 5 wt. %, based in each case on graft polymer B2, of n-butyl acrylate.

As a result of the preparative process, the graft polymer B2 generally comprises free copolymer of B2.1.1 and B2.1.2, i.e. copolymer not chemically bonded to the rubber base, which is distinguished in that it can be dissolved in suitable solvents (e.g. acetone).

Preferably, component B2 comprises a free copolymer of B2.1.1 and B2.1.2 which has a weight-average molecular weight (Mw), determined by gel permeation chromatography with polystyrene as standard, preferably of 50,000 to 200,000 g/mol, particularly preferably of 70,000 to 150,000 g/mol and very particularly preferably of 80,000 to 120,000 g/mol.

Component B3

As a further component B3 the composition can optionally comprise (co)polymers of at least one monomer from the group comprising vinylaromatics, vinyl cyanides (unsaturated nitriles), (meth)acrylic acid (C1 to C8)-alkyl esters, unsaturated carboxylic acids, and derivatives (such as anhydrides and imides) of unsaturated carboxylic acids.

(Co)polymers which are particularly suitable as component B3 are those of

B3.1 50 to 99 wt. %, preferably 65 to 85 wt. % and particularly preferably 70 to 80 wt. %, based on (co)polymer B3, of at least one monomer selected from the group comprising vinylaromatics (e.g. styrene, α-methylstyrene), ring-substituted vinylaromatics (e.g. p-methylstyrene, p-chlorostyrene) and (meth)acrylic acid (C1-C8)-alkyl esters (e.g. methyl methacrylate, n-butyl acrylate, tert-butyl acrylate), and B3.2 1 to 50 wt. %, preferably 15 to 35 wt. % and particularly preferably 20 to 30 wt. %, based on (co)polymer B3, of at least one monomer selected from the group comprising vinyl cyanides (e.g. unsaturated nitriles such as acrylonitrile and methacrylonitrile), (meth)acrylic acid (C1-C8)-alkyl esters (e.g. methyl methacrylate, n-butyl acrylate, tert-butyl acrylate), unsaturated carboxylic acids and derivatives of unsaturated carboxylic acids (e.g. maleic anhydride and N-phenylmaleimide).

These (co)polymers B3 are resinous, thermoplastic and rubber-free. The copolymer of styrene (B3.1) and acrylonitrile (B3.2) is particularly preferred.

Such (co)polymers B3 are known and can be prepared by free radical polymerization, especially by emulsion, suspension, solution or bulk polymerization.

The (co)polymers B3 have a weight-average molecular weight (Mw), determined by gel permeation chromatography with polystyrene as standard, preferably of 50,000 to 200,000 g/mol, particularly preferably of 70,000 to 150,000 g/mol and very particularly preferably of 80,000 to 130,000 g/mol.

Component C

The composition can optionally also comprise commercially available polymer additives as component C.

Examples of commercially available polymer additives suitable as component C are flameproofing agents (e.g. phosphorus or halogen compounds), flameproofing synergists (e.g. nanoscale metal oxides), smoke inhibiting additives (e.g. boric acid or borates), antidripping agents (e.g. compounds from the classes of substances comprising fluorinated polyolefins, silicones and aramide fibres), internal and external lubricants and demoulding agents (e.g. pentaerythritol tetrastearate, montan wax or polyethylene wax), fluidity improvers (e.g. low molecular vinyl (co)polymers), antistatic agents (e.g. block copolymers of ethylene oxide and propylene oxide, other polyethers or polyhydroxy ethers, polyetheramides, polyesteramides or sulfonic acid salts), conductivity additives (e.g. conductive carbon black or carbon nanotubes), stabilizers (e.g. UV/light stabilizers, heat stabilizers, antioxidants, transesterification inhibitors, hydrolysis stabilizers), antibacterial additives (e.g. silver or silver salts), additives for improving scratch resistance (e.g. silicone oils or hard fillers such as ceramic (hollow) spheres or quartz powder), IR absorbents, optical brighteners, fluorescent additives, fillers and reinforcing agents (e.g. talc, ground glass or carbon fibres, glass or ceramic (hollow) spheres, mica, kaolin, CaCO3 and glass flakes), acids, dyestuffs and pigments (e.g. carbon black, titanium dioxide or iron oxide) or mixtures of several of said additives.

In one preferred embodiment, the compositions according to the invention comprise as component C at least one component selected from the group comprising demoulding agents and at least one component selected from the group comprising stabilizers. In one particularly preferred embodiment, pentaerythritol tetrastearate is used as the demoulding agent. In one particularly preferred embodiment, at least one compound selected from the group comprising sterically hindered phenols, organic phosphites and Brønsted acid compounds is used as the stabilizer.

In particular, as component C the compositions according to the invention can also comprise flameproofing agents, e.g. halogenated organic compounds or phosphorus-containing flameproofing agents, the latter being used preferentially.

In terms of the invention, phosphorus-containing flameproofing agents are preferably selected from the groups comprising monomeric and oligomeric phosphoric and phosphonic acid esters, phosphonatoamines and phosphazenes, it also being possible to use as flameproofing agents mixtures of several compounds selected from one of these groups or from different groups. Other halogen-free phosphorus compounds not specifically mentioned here can also be used on their own or in any desired combination with other halogen-free phosphorus compounds.

Preferred monomeric and oligomeric phosphoric or phosphonic acid esters are phosphorus compounds of general formula (IV):

$$R^1-(O)_n-\overset{\overset{O}{\|}}{\underset{\underset{R^2}{|}}{\underset{(O)_n}{|}}{P}}-\left[O-X-O-\overset{\overset{O}{\|}}{\underset{\underset{R^3}{|}}{\underset{(O)_n}{|}}{P}}\right]_q-(O)_n-R^4 \quad (IV)$$

where $R^1$, $R^2$, $R^3$ and $R^4$ independently of one another are each optionally halogenated C1- to C8-alkyl, or C5- to C6-cycloalkyl, C6- to C20-aryl or C7- to C12-aralkyl each optionally substituted by alkyl, preferably C1- to C4-alkyl, and/or halogen, preferably chlorine or bromine, n independently of one another are 0 or 1, q is 0 to 30 and X is a mononuclear or polynuclear aromatic radical having 6 to 30 C atoms, or a linear or branched aliphatic radical having 2 to 30 C atoms which can be OH-substituted and can comprise up to 8 ether bonds.

Preferably, $R^1$, $R^2$, $R^3$ and $R^4$ independently of one another are C1- to C4-alkyl, phenyl, naphthyl or phenyl-C1-C4-alkyl. The aromatic groups $R^1$, $R^2$, $R^3$ and $R^4$ for their part can be substituted by halogen and/or alkyl groups, preferably chlorine, bromine and/or C1- to C4-alkyl. Particularly preferred aryl radicals are cresyl, phenyl, xylenyl, propylphenyl or butylphenyl and the corresponding brominated and chlorinated derivatives thereof.

X in formula (IV) is preferably a mononuclear or polynuclear aromatic radical having 6 to 30 C atoms which is preferably derived from diphenols of formula (I).

n in formula (IV) can independently of one another be 0 or 1; n is preferably equal to 1.

q has values from 0 to 30. When mixtures of different components of formula (IV) are used, it is possible to use mixtures preferably with number-average q values of 0.3 to 10, particularly preferably of 0.5 to 10 and very particularly preferably of 1.05 to 1.4.

X is particularly preferably

[chemical structures of phenyl, bisphenol A, diphenylmethane, and biphenyl moieties]

or their chlorinated or brominated derivatives, X being derived in particular from resorcinol, hydroquinone, bisphenol A or diphenylphenol. Particularly preferably, X is derived from bisphenol A.

The use of oligomeric phosphoric acid esters of formula (IV) which are derived from bisphenol A is particularly advantageous because the compositions incorporating this phosphorus compound have a particularly high stress cracking resistance and stability to hydrolysis, together with a particularly low tendency to form a coating during processing by injection moulding. Furthermore, these flameproofing agents make it possible to achieve a particularly high dimensional stability under heat.

Monophosphates (q=0), oligophosphates (q=1-30) or mixtures of monophosphates and oligophosphates can be used as component C according to the invention.

In particular, monophosphorus compounds of formula (IV) are tributyl phosphate, tris(2-chloroethyl)phosphate, tris(2,3-dibromopropyl)phosphate, triphenyl phosphate, tricresyl phosphate, diphenyl cresyl phosphate, diphenyl octyl phosphate, diphenyl 2-ethylcresyl phosphate, tri(isopropylphenyl)phosphate, halogen-substituted aryl phosphates, methylphosphonic acid dimethyl ester, methylphosphonic acid diphenyl ester, phenylphosphonic acid diethyl ester, triphenylphosphine oxide or tricresylphosphine oxide.

The phosphorus compounds of formula (IV) are known (cf. e.g. EP-A 363 608, EP-A 640 655) or can be prepared analogously by known methods (e.g. Ullmanns Enzyklopädie der technischen Chemie, vol. 18, p. 301 et seq., 1979; Houben-Weyl, Methoden der organischen Chemie, vol. 12/1, p. 43; Beilstein, vol. 6, p. 177).

The mean q values can be determined by using a suitable method (gas chromatography (GC), high pressure liquid chromatography (HPLC), gel permeation chromatography (GPC)) to determine the composition of the phosphate mixture (molecular weight distribution) and calculating the mean values for q therefrom.

Phosphonatoamines are preferably compounds of formula (V):

$$A_{3-y}\text{-}NB^1_y \quad (V)$$

in which

A is a radical of formula (Va):

[chemical structure Va showing R11, R12, CH2-O, P-CH2 ring]

$$(Va)$$

or (Vb):

[chemical structure Vb showing R13-O, R14-O, P-CH2]

$$(Vb)$$

R11 and R12 independently of one another are unsubstituted or substituted C1-C10-alkyl or unsubstituted or substituted C6- to C1-10-aryl, R13 and R14 independently of one another are unsubstituted or substituted C1- to C1-10-alkyl or unsubstituted or substituted C6- to C1-10-aryl, or R13 and R14 together are unsubstituted or substituted C3- to C1-10-alkylene, y has the numerical values 0, 1 or 2 and B1 independently is hydrogen, optionally halogenated C2- to C8-alkyl or unsubstituted or substituted C6- to C1-10-aryl.

B1 independently is preferably hydrogen, ethyl, n- or isopropyl which can be substituted by halogen, or C6- to C1-10-aryl which is unsubstituted or substituted by C1- to C4-alkyl and/or halogen, especially phenyl or naphthyl.

Alkyl in R11, R12, R13 and R14 independently is preferably methyl, ethyl, n-propyl, isopropyl, n-, iso-, sec- or tert-butyl, pentyl or hexyl.

Substituted alkyl in R11, R12, R13 and R14 independently is preferably C1- to C1-10-alkyl substituted by halogen, especially monosubstituted or disubstituted methyl, ethyl, n-propyl, isopropyl, n-, iso-, sec- or tert-butyl, pentyl or hexyl.

C6- to C1-10-aryl in R11, R12, R13 and R14 independently is preferably phenyl, naphthyl or binaphthyl, especially o-phenyl, o-naphthyl or o-binaphthyl, which can be substituted (generally mono-, di- or trisubstituted) by halogen.

R13 and R14 can form a ring structure together with the oxygen atoms to which they are directly bonded, and the phosphorus atom.

The following are mentioned as preferred examples: 5,5,5',5',5'',5''-hexamethyltris(1,3,2-dioxaphosphorinanemethane)amine 2,2',2''-trioxide of formula (Va-1):

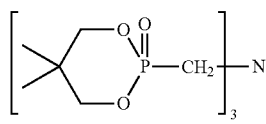
(Va-1)

N-butyl-N-[(5,5-dimethyl-1,3,2-dioxaphosphorinan-2-yl)methyl]-5,5-dimethyl-1,3,2-dioxaphosphorinane-2-methanamine P,2-dioxide; N-[(5,5-dimethyl-1,3,2-dioxaphosphorinan-2-yl)methyl]-5,5-dimethyl-N-phenyl-1,3,2-dioxaphosphorinane-2-methanamine P,2-dioxide; N,N-dibutyl-5,5-dimethyl-1,3,2-dioxaphosphorinane-2-methanamine 2-oxide; N-[(5,5-dimethyl-1,3,2-dioxaphosphorinan-2-yl)methyl]-N-ethyl-5,5-dimethyl-1,3,2-dioxaphosphorinane-2-methanimine P,2-dioxide; N-butyl-N-[(5,5-dichloromethyl-1,3,2-dioxaphosphorinan-2-yl)methyl]-5,5-dichloromethyl-1,3,2-dioxaphosphorinane-2-methanamine P,2-dioxide; N-[(5,5-dichloromethyl-1,3,2-dioxaphosphorinan-2-yl)methyl]-5,5-dichloromethyl-N-phenyl-1,3,2-dioxaphosphorinane-2-methanamine P,2-dioxide; N,N-di(4-chlorobutyl)-5,5-dimethyl-1,3,2-dioxaphosphorinane-2-methanamine 2-oxide; and N-[(5,5-dimethyl-1,3,2-dioxaphosphorinan-2-yl)methane]-N-(2-chloroethyl)-5,5-di(chloromethyl)-1,3,2-dioxaphosphorinane-2-methanimine P,2-dioxide.

The following are also preferred:
compounds of formula (Va-2) or (Va-3):

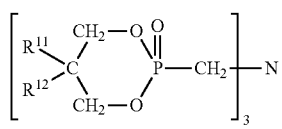
(Va-2)

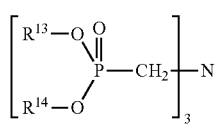
(Va-3)

where
R$^{11}$, R$^{12}$, R$^{13}$ and R$^{14}$ are as defined above.

Particularly preferred compounds are those of formulae (Va-2) and (Va-1). The preparation of the phosphonatoamines is described e.g. in U.S. Pat. No. 5,844,028.

Phosphazenes are compounds of formulae (VIa) and (VIb):

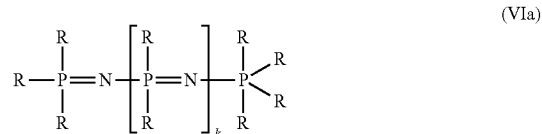
(VIa)

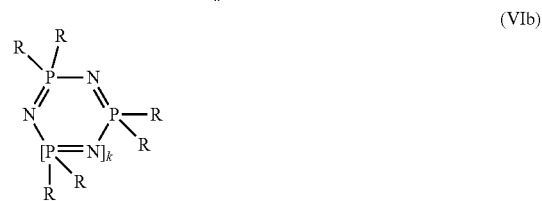
(VIb)

where
R are identical or different and are amino, C1- to C8-alkyl or C1- to C8-alkoxy each optionally halogenated, preferably with fluorine, C5- to C6-cycloalkyl each optionally substituted by alkyl, preferably C1- to C4-alkyl, and/or halogen, preferably chlorine and/or bromine, C6- to C20-aryl, preferably phenyl or naphthyl, C6- to C20-aryloxy, preferably phenoxy or naphthyloxy, or C7- to C12-aralkyl, preferably phenyl-C1-C4-alkyl, and k is 0 or a number from 1 to 15, preferably a number from 1 to 10.

Examples which may be mentioned are propoxyphosphazene, phenoxyphosphazene, methylphenoxyphosphazene, aminophosphazene and fluoroalkylphosphazenes. Phenoxyphosphazene is preferred.

The phosphazenes can be used on their own or as a mixture. The radicals R can all be the same or 2 or more radicals in formulae (VIa) and (VIb) can be different. Phosphazenes and their preparation are described e.g. in EP-A 728 811, DE-A 1 961 668 and WO 97/40092.

The flameproofing agents can be used on their own or in any desired mixture with one another or in a mixture with other flameproofing agents.

Furthermore, in one preferred embodiment, flameproofed compositions comprise the aforementioned flameproofing agents in combination with at least one antidripping agent selected from the classes of substances comprising fluorinated polyolefins, silicones and aramide fibres. It is particularly preferable to use polytetrafluoroethylene polymers as antidripping agents.

Preparation of the Moulding Compounds and Production of the Mouldings

The thermoplastic moulding compounds according to the invention are prepared by mixing the appropriate constituents in known manner and compounding and extruding the mixture in the melt at temperatures of 180° C. to 350° C., preferably of 220 to 320° C. and particularly preferably of 230 to 300° C. in conventional machines such as internal kneaders, extruders and twin shaft screws.

In known manner the individual constituents can be mixed either successively or simultaneously and either at about 20° C. (room temperature) or at a higher temperature.

In one preferred embodiment, in a first step all or part of component B1 is reacted with all or part of component B3 to give a precompound, and in a second step the composition according to the invention is produced using the precompound prepared in this way.

In one particularly preferred embodiment, in the first step the graft polymer B1 or part of component B1 is reacted with all or part of component B3 by compounding, with vacuum degassing, to give a low emission precompound. In this compounding with degassing, it is particularly advantageous to use component B1 in the moist state (i.e. in the presence of water). Such processes are described e.g. in EP 0 768 157 A1 and EP 0 867 463 A1. Particularly suitable precompounds are those whose total content of volatile organic compounds is less than 1000 mg/kg, preferably less than 800 mg/kg and particularly preferably less than 500 mg/kg. In the second process step the remaining constituents and the precompound are mixed in known manner and compounded or extruded in the melt at the aforementioned temperatures in conventional machines such as internal kneaders, extruders and twin shaft screws. In one preferred embodiment, a pressure of <500 mbar, preferably of <400 mbar and particularly preferably of <200 mbar (absolute) is applied during this second compounding step for the further degassing of volatile constituents (e.g. residual monomers and residual solvents).

The invention therefore also provides a process for the preparation of low emission compositions according to the invention.

The moulding compounds according to the invention can be used to produce all kinds of mouldings. These can be produced by injection moulding, extrusion and blow moulding. Another form of processing is the production of mouldings by deep drawing from previously produced sheets or films.

Examples of such mouldings are films; profiles; all kinds of housing parts, e.g. for domestic appliances such as juice presses, coffee machines and mixers, and for office machines such as monitors, flat screens, notebooks, printers and copiers; sheets; tubes; electrical conduits; windows, doors and other profiles for the building sector (interior finishings and exterior applications); electrical and electronic components such as switches, plugs and sockets; and body parts or interior parts for commercial vehicles, especially for the automobile industry.

In particular, the moulding compounds according to the invention can also be used e.g. for the production of the following mouldings: interior finishings for railway vehicles, ships, aircraft, buses and other motor vehicles; housings for electrical equipment containing small transformers; housings for information processing and transmission equipment; housings and coverings for medical equipment; massage equipment and associated housings; toy vehicles for children; wall panels; housings for security devices; thermally insulated shipping cases; mouldings for sanitaryware and bath fittings; cover grids for ventilator outlets; and housings for garden equipment.

The compositions according to the invention are also particularly suitable for the production of mouldings with a high gloss finish that demand a class A surface, which have optionally been subjected, in whole or in part, to a further surface treatment step involving e.g. lacquering, in-mould decoration, or metallization by vacuum deposition or galvanization.

In terms of the present invention, "high gloss" is understood as meaning a gloss level, determined by reflection according to DIN 67530 at a measurement angle of 60°, of at least 95, preferably of at least 97 and particularly preferably of at least 99. The invention thus also provides mouldings from the compositions according to the invention, with a full or partial high gloss finish, which have optionally been subjected, in whole or in part, to a further surface treatment step involving e.g. lacquering, in-mould decoration, or metallization by vacuum deposition or galvanization.

Component A1

Linear polycarbonate based on bisphenol A with a weight-average molecular weight $M_w$ of 28 kg/mol (determined by GPC in methylene chloride at 25° C. with polycarbonate as standard)

Component B1

Precompound of 50 wt. % of a graft polymer of the ABS type, prepared by the emulsion polymerization method, with an A:B:S ratio of 12:50:38 wt. %, and 50 wt. % of a styrene-acrylonitrile copolymer, prepared by the bulk polymerization method, with a styrene:acrylonitrile ratio of 76:24 wt. % and a weight-average molecular weight Mw of 100 kg/mol, measured by GPC in dimethylformamide at 20° C. with polystyrene as standard. As a result of the preparative process, component B1 comprises 900 mg/kg of the precipitant magnesium sulfate used in the coagulation of the graft polymer. As evidenced by scanning electron microscopy (SEM) coupled with energy dispersive x-ray spectroscopy (EDX), this magnesium sulfate is present in crystalline domains, some of which have a size of up to more than 100 μm.

The magnesium sulfate content of component B1 was determined by quantitatively measuring the sulfate ion content and converting it to magnesium sulfate, since a determination from the magnesium content is not possible due to a lack of selectivity for MgSO4. This was done by accurately weighing out approx. 1 g of component B1, adding 25 ml of acetone p.a. and treating the mixture for 30 minutes in an ultrasonic bath. The resulting suspension was made up to 200 ml with Millipore water and shaken thoroughly. The suspension treated in this way was filtered through a membrane. The sulfate ion content was determined on the filtrate by ion chromatography using a DIONEX DX 600 ion chromatograph (from DIONEX) (separating column: IonPac AS 11, 4×250 mm (from DIONEX); mobile phase: NaOH gradient, c=0.004/0.076 mol/l; flow rate: 1.8 ml/min; autosampler temperature: 23° C.; column temperature: 35° C.; suppression: electrochemical, ASRS 300, 4 mm; detection: conductivity).

Component B2 n-Butyl acrylate-modified graft polymer of the ABS type, prepared by the bulk polymerization method, with an A:B:S ratio of 21:10:65 wt. % and an n-butyl acrylate content of 4 wt. %. The D50 value of the graft particle diameters, determined by ultracentrifugation, is 0.5 nm. The graft base underlying the graft polymer is a styrene-butadiene block copolymer rubber (SBR). The gel content of the graft polymer, measured in acetone, is 20 wt. %. The weight-average molecular weight $M_w$, measured by GPC in dimethylformamide at 20° C. with polystyrene as standard, of the free n-butyl acrylate-modified SAN, i.e. modified SAN not chemically bonded to the rubber or included in the rubber particles in acetone-insoluble form, is 110 kg/mol.

Component B3

Styrene-acrylonitrile copolymer, prepared by the bulk polymerization method, with a styrene-acrylonitrile ratio of 76:24 wt. % and a weight-average molecular weight $M_w$ of 100 kg/mol, measured by GPC in dimethylformamide at 20° C. with polystyrene as standard Component C1

Pentaerythritol tetrastearate as lubricant/demoulding agent

Component C2

Phosphorous acid ester of bis(2-hydroxy-3-cyclohexyl-5-methylphenyl)methane of the formula

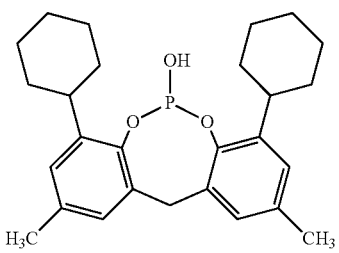 [SMILES: Cc1cc2c(c(C3CCCCC3)c1)OP(O)Oc1c(cc(C)cc1C1CCCCC1)C2]

Component C3
Heat stabilizer, Irganox 1076, BASF (Ludwigshafen, Germany)

Production and Testing of the Mouldings

The compositions were prepared on an Evolum® 32 HT twin shaft extruder from Clextral (France) with a length-to-diameter ratio L/D of 36, at a stock temperature of 280 to 290° C. and under a negative pressure of 100-200 mbar (absolute). Compounding was carried out on the one hand without melt filtration (Comparative Examples 1 and 4) and on the other hand with melt filtration using melt filters with mesh sizes of 300 µm (Comparative Example 2), 75 µm (Comparative Examples 3, 5 and 6), 42 µm (Example 1) and 25 µm (Examples 2-4); in Comparative Example 6 and Example 4 only the emulsion ABS component B1 was melt-filtered in an additional upstream compounding step and the starting material purified in this way was then used in the compounding of the PC+ABS compositions according to Comparative Example 6 and Example 4 without further melt filtration in this downstream compounding step. Through the melt filtrations, impurities, gel particles, agglomerates and also salt inclusions with a diameter above the particular mesh size were either filtered out or reduced on the sieve to smaller particles with diameters below the particular mesh size used.

The granules resulting from the compounding in question were processed on an injection moulding machine (from Arburg), at melt temperatures of 260° C. and a mould temperature of 80° C., to sheets of dimensions 150 mm×105 mm×2 mm. A high gloss polished mould was used for this purpose.

These sheets were exposed for 3 days at 40° C. to an air atmosphere having a relative humidity of 95%.

They were then assessed visually by 3 independent assessors according to the following evaluation scale:

++ no blisters at all or only isolated, very small blisters
+ a few very small, not yet disruptive blisters
− many very small blisters and/or only isolated larger blisters
−− many larger blisters This was followed by a quantitative evaluation of the defects according to number, type and size by means of light microscopy using the differential interference contrast (DIC) method and digital imaging using a Zeiss Axioplan microscope with 100× magnification in reflected light mode. In each case half of the surface of the sheet was examined on one side for blisters, a blister being defined as a disruption of the surface that represents an exclusively positive change in topography, i.e. an elevation beyond the normal surface level without any associated depressions in the surface profile. The evaluation was made from the measured individual diameters d of the individual blister defects by determining the maximum blister diameter dmax.

The Examples in Table 1 show that to achieve a visually satisfactory surface quality after heat-moisture storage, there should not be any blisters with a diameter exceeding 240 µm on the surface of the class A component (dmax<240 µm). Surprisingly, the achievement of such a quality necessitates limiting the diameter of the blister-causing salt inclusions to a fraction of the blister size that is obviously visually tolerable. Accordingly, a satisfactory surface quality is only achieved when the composition comprises no salt inclusions with a size exceeding 42 µm (Examples 1-4), preferably no salt inclusions with a size exceeding 25 µm (Examples 2-4), it obviously being of secondary importance which method is used to achieve such a limitation of the size of the salt inclusions.

TABLE 1

| Composition | CE1 | CE2 | CE3 | 1 | 2 | CE4 | CE5 | 3 | CE6 | 4 |
|---|---|---|---|---|---|---|---|---|---|---|
| A1 | 60.35 | 60.35 | 60.35 | 60.35 | 60.35 | | | | 60.35 | 60.35 |
| B1 | 23.16 | 23.16 | 23.16 | 23.16 | 23.16 | 100 | 100 | 100 | 23.16 | 23.16 |
| B2 | 8.90 | 8.90 | 8.90 | 8.90 | 8.90 | | | | 8.90 | 8.90 |
| B3 | 6.53 | 6.53 | 6.53 | 6.53 | 6.53 | | | | 6.53 | 6.53 |
| C1 | 0.74 | 0.74 | 0.74 | 0.74 | 0.74 | | | | 0.74 | 0.74 |
| C2 | 0.12 | 0.12 | 0.12 | 0.12 | 0.12 | | | | 0.12 | 0.12 |
| C3 | 0.20 | 0.20 | 0.20 | 0.20 | 0.20 | | | | 0.20 | 0.20 |
| Melt filtration (filter size [µm]) | No | yes (300) | yes (75) | yes (42) | yes (25) | no | yes (75) | yes (25) | yes (75) | yes (25) |
| Comment | | | | | | | | | only B1 melt-filtered | only B1 melt-filtered |
| Properties | | | | | | | | | | |
| visual evaluation | — | — | — | + | +/++ | — | — | + | — | + |
| microscopic evaluation max. defect size $d_{max}$ [µm] | 390 | 296 | 298 | 239 | 176 | | | 187 | 240 | 152 |

The invention claimed is:
1. A polymer composition comprising:
A) from 0 to 98 parts by weight, of at least one thermoplastic polymer,
B) from 2 to 100 parts by weight, of
B1) at least one graft polymer prepared by an emulsion polymerization method,
B2) optionally at least one graft polymer prepared by a bulk, suspension or solution polymerization method, and
B3) optionally at least one rubber-free vinyl (co)polymer, and wherein, said weights of A and B are based on the sum of A and B,
C) from 0 to 30 parts by weight of at least one polymer additive, wherein the sum of the parts by weight of A and B being 100, wherein (i) the composition comprises at least one inorganic salt comprising a cation selected from the group consisting of alkali metals, alkaline earth metals and aluminium, and an anion selected from the group consisting of chloride, sulfate, nitrate, phosphate, acetate and formate, in a concentration of 100 to 5000 mg/kg, based on the composition, and (ii) said inorganic salt is present in the composition exclusively in dissolved form or in the form of amorphous and/or crystalline inclusions having a size of not more than 60 μm.

2. The polymer composition according to claim 1, comprising:

A) from 1 to 95 parts by weight of said thermoplastic polymer, based on the sum of A and B, B) from 5 to 99 parts by weight of said B, based on the sum of A and B, and C) from 0.1 to 20 parts by weight of said polymer additive, based on the sum of A and B.

3. The polymer composition according to claim 1, comprising:

A) from 30 to 85 parts by weight of said thermoplastic polymer, based on the sum of A and B, B) from 15 to 70 parts by weight of said B, based on the sum of A and B, and C) from 0.3 to 7 parts by weight of said polymer additive, based on the sum of A and B.

4. The polymer composition according to claim 1, wherein said anion is selected from the group consisting of chloride and sulfate.

5. The polymer composition according to claim 1, wherein said salt comprises magnesium sulfate.

6. The polymer composition according to claim 1, wherein said composition comprises said salt or a mixture comprising said salt in a concentration of from 200 to 1000 mg/kg, based on said composition.

7. The polymer composition according to claim 1, wherein said salt is present in the composition in the form of amorphous and/or crystalline inclusions having a size of not more than 30 μm.

8. The polymer composition according to claim 1, wherein said composition additionally comprises a dispersant and/or a metal complexing agent.

9. The polymer composition according to claim 2, wherein said composition comprises as component C at least one representative selected from the group consisting of flameproofing agents, flameproofing synergists, smoke inhibiting additives, antidripping agents, internal and external lubricants, demoulding agents, fluidity improvers, antistatic agents, conductivity additives, UV stabilizers, light stabilizers, heat stabilizers, antioxidants, transesterification inhibitors, hydrolysis stabilizers, antibacterial additives, additives for improving scratch resistance, IR absorbents, optical brighteners, fluorescent additives, fillers and reinforcing agents, acids, dyestuffs, and pigments.

10. The polymer composition according to claim 1, wherein said component B1 comprises said inorganic salt therein.

11. The polymer composition according to claim 1, wherein said component B comprises at least two components selected from the group consisting of B1, B2 and B3.

12. A process for preparing a polymer composition according to claim 1, comprising subjecting said component B1, and/or a precompound of component B1 with all or part of at least one of components B2 and/or B3, to melt filtration using a sieve with a mesh size of not more than 60 μm.

13. A moulding produced from a polymer composition according to claim 1, comprising a full or partial high gloss finish that demands a class A surface, which can optionally be subjected, in whole or in part, to a further surface treatment step optionally comprising lacquering, in-mould decoration, and/or metallization by vacuum deposition and/or galvanization.

14. A moulding produced from a polymer composition according to claim 1, comprising a class A surface and a full or partial high gloss finish, wherein a gloss level thereof range from at least 95, determined by reflection according to DIN 67530 at a measurement angle of 60°, which can optionally be subjected, in whole or in part, to a further surface treatment step optionally comprising lacquering, in-mould decoration, and/or metallization by vacuum deposition and/or galvanization.

15. The polymer composition according to claim 1, wherein said component B comprises B1, B2, and B3.

16. The polymer composition according to claim 1, wherein the mean size (D50) of the at least one graft polymer B1 is from 0.1 to 1.0 μm.

17. The polymer composition according to claim 1, wherein the mean size (D50) of the at least one graft polymer B1 is from 0.2 to 0.5 μm.

18. The polymer composition according to claim 1, wherein the gel content of the at least one graft polymer B1 is at least 75 wt % (measured in acetone).

19. The polymer composition according to claim 1, wherein B2 is present and the gel content of the at least one graft polymer B2 is from 15 to 30 wt % (measured in acetone).

20. The polymer composition according to claim 1, wherein B3 is present and wherein the weight-average molecular weight (Mw) of the at least one rubber-free vinyl (co)polymer B3 is from 70,000 to 150,000 g/mol.

* * * * *